2,857,457

CHROMINANCE-SIGNAL DEMODULATING SYSTEM

Donald Richman, Fresh Meadows, N. Y., assignor to Hazeltine Research, Inc., Chicago, Ill., a corporation of Illinois Application May 7, 1956, Serial No. 583,305

12 Claims. (Cl. 178—5.4)

*General*

Figure 1:
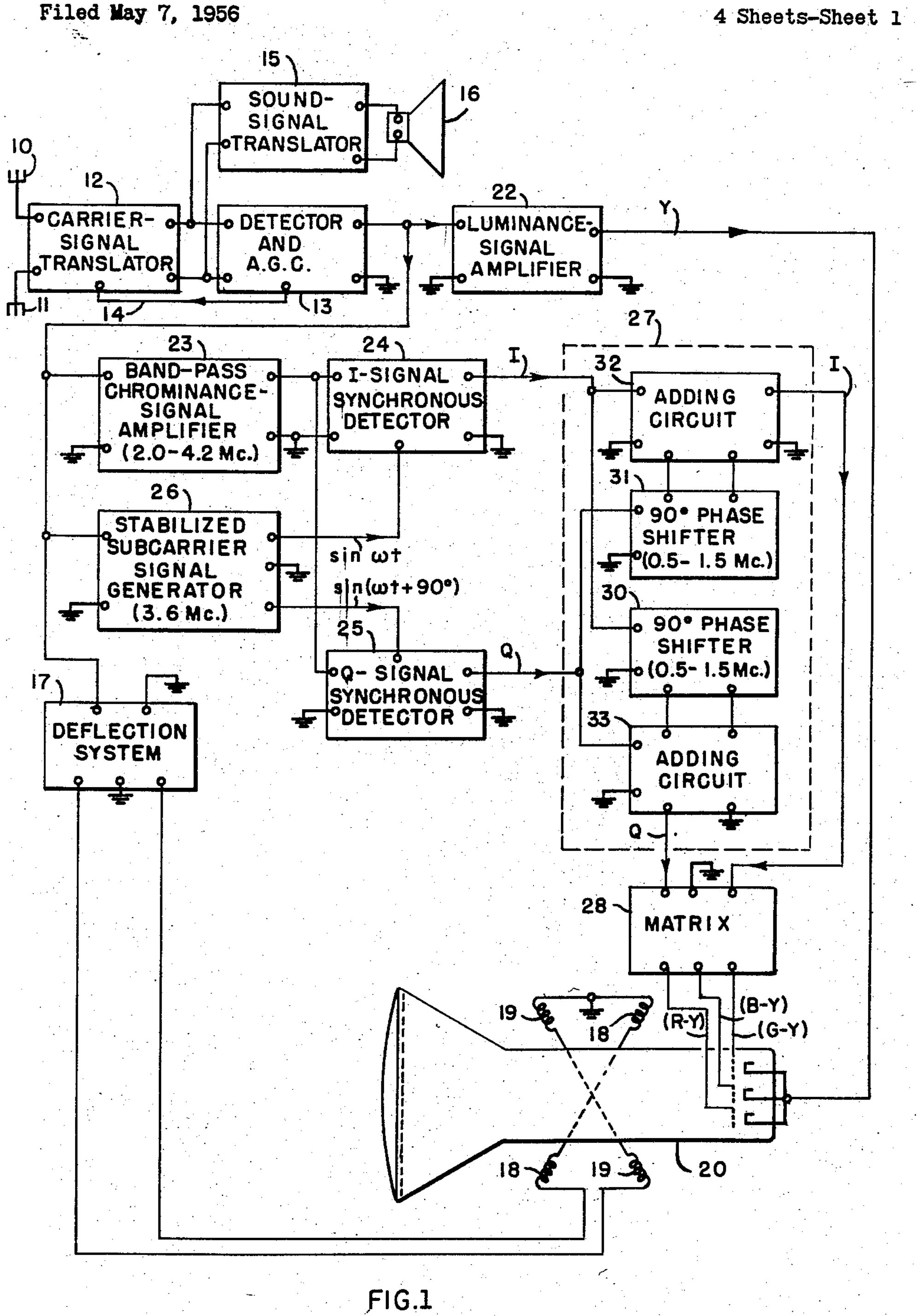

This invention relates to chrominance-signal demodulating systems for color-television receivers and is particularly useful in color-television receivers which utilize a three-gun picture tube.

According to the color-television signal specification approved by the Federal Communication Commission, a complete color-television signal includes a luminance signal and a chrominance signal, the luminance signal primarily representing the luminance or brightness characteristics of the scene being televised while the chrominance signal represents the differential color content of the scene being televised. In this manner, the luminance signal may be used by itself to produce a complete black-and-white or monochrome picture.

The chrominance signal is formed by encoding a pair of color-difference signals as the modulation of a pair of subcarrier signals, where the subcarrier signals are of the same frequency but differ in phase from one another by 90°. As the name implies, the color-difference signal represents the difference between the entire signal needed to reproduce a given color and the luminance portion of the entire signal. In other words, a color-difference signal represents the additional color information which must be added to the luminance information in order to reproduce the corresponding color. The two modulated subcarrier signals are subsequently added together to produce a resultant subcarrier frequency chrominance signal which varies in both phase and amplitude. The amplitude of the resultant subcarrier frequency chrominance signal is representative of the saturation or purity of the color to be reproduced while the phase of the resultant signal is representative of the color or hue which is to be reproduced.

In order to reproduce color images at the receiver, the reverse process must occur, namely, the chrominance signal must be separated from the luminance signal and, in turn, broken down into a pair of color-difference signals. The two color-difference signals are separated out from the subcarrier frequency chrominance signal by means of the chrominance-signal demodulating system of the color-television receiver. To this end, the chrominance-signal demodulating system usually includes a pair of synchronous detectors, each of which derives a different color-difference signal.

In accordance with the color-television signal specifications approved by the Federal Communications Commission, it is specified that one of the color-difference signals, commonly referred to as the Q signal, shall be transmitted as a narrow band signal of approximately 0–0.5 megacycle band width while the other color-difference signal, commonly referred to as the I signal, shall be transmitted as a relatively wide band signal of approximately 0–1.5 megacycle band width. Both of the I and Q color-difference signals are encoded as modulation on their respective ones of the pair of 90° or quadrature-phased subcarriers which are subsequently added together to produce the desired subcarrier frequency chrominance signal. In order to fit the resultant subcarrier frequency chrominance signal within the allocated 6 megacycle band width, the upper side-band part corresponding to the high-frequency portion, that is, the 0.5–1.5 megacycle portion, of the wide band I color-difference signal is eliminated prior to transmission. Thus, the high-frequency portion of the wide band I signal is transmitted as a single-side-band signal. The resulting amplitude distortion which may be produced in the color-difference signals derived by the receiver synchronous detectors as a result of such single-side-band transmission is referred to as color or quadrature cross talk, the term "cross talk" denoting an undesirable intermingling of the signal information of the two demodulated color-difference signals. It is a purpose of this invention to provide a new and improved method for minimizing such cross-talk distortions. In this regard, it should be carefully noted that in order to obtain maximum use of all the available color information, the single-side-band portion of the I color-difference signal must be used.

The Federal Communications Commission approved signal specification was carefully tailored so that this could be accomplished by utilizing properly designed filter circuits. This envisioned operation may be achieved if the synchronous detectors of the receiver are operated so as to directly recover the I and Q color-difference signals. Frequently, however, other circuit economies are obtainable if the synchronous detectors are operated so as to directly derive other color-difference signals than the I and Q color-difference signals. Also, in practice, it is expensive to construct filter circuits for obtaining ideal I–Q operation without introducing undesirable amounts of phase-shift distortion.

Another factor which sometimes causes distortion of the color-difference signals is phase distortion of the subcarrier frequency chrominance signal prior to its demodulation in the receiver synchronous detectors, such distortion causing an undesired intermingling of the signal information in the demodulated color-difference signals. Such phase distortion results from circuits prior to the synchronous detector, including transmitter circuits, which have a nonuniform phase-shift versus frequency characteristic. Thus, careful and painstaking design of these circuits is required in order to hold the phase distortion to a minimum. When this is done, however, the design of such circuits is often more complex than is desirable.

It is an object of the invention, therefore, to provide a new and improved chrominance-signal demodulating system which avoids one or more of the foregoing limitations of such systems heretofore proposed.

It is a further object of the invention to provide a new and improved chrominance-signal demodulating system which is effective to minimize any distortion present in the color-difference signals derived by such system.

It is an additional object of the invention to provide a new and improved chrominance-signal demodulating system which makes full use of all the available chrominance-signal information without introducing undesirable color cross talk.

It is yet another object of the invention to provide a new and improved chrominance-signal demodulating system which enables other than I and Q color-difference signals to be derived without introducing undesirable color cross talk while, at the same time, enabling full utilization of all the available chrominance-signal information.

In accordance with the invention, a chrominance-signal demodulating system for developing the color information signals for driving the image-reproducing device of a color-television receiver comprises circuit means for supplying a subcarrier frequency chrominance signal, the phase and amplitude of which are representative of the color content of the scene being televised. The system also includes detector circuit means responsive to the subcarrier frequency chrominance signal for deriving therefrom modulation components which represent first and second video-frequency color-difference signals which tend to be distorted. The system further includes cross-coupling circuit means for combining a portion of the first color-difference signal with the second and a portion of the second with the first for minimizing any distortion present in either of the color-difference signals. Additionally, the system includes a matrix circuit responsive to the two distortion-compensated color-difference signals for producing the desired color information signals for driving the image-reproducing device.

For a better understanding of the present invention, together with other and further objects thereof, reference is had to the following description taken in connection with the accompanying drawings, and its scope will be pointed out in the appended claims.

Figure 7:
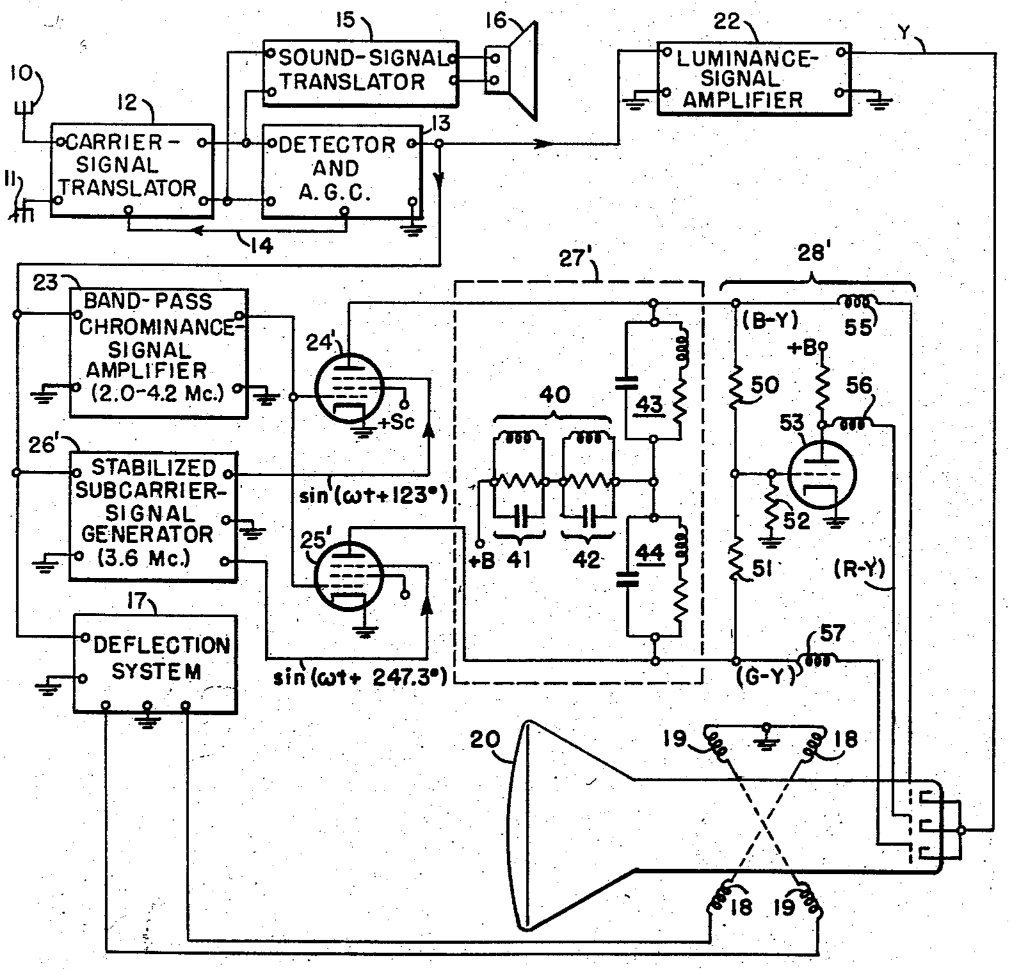
Figure 8A:
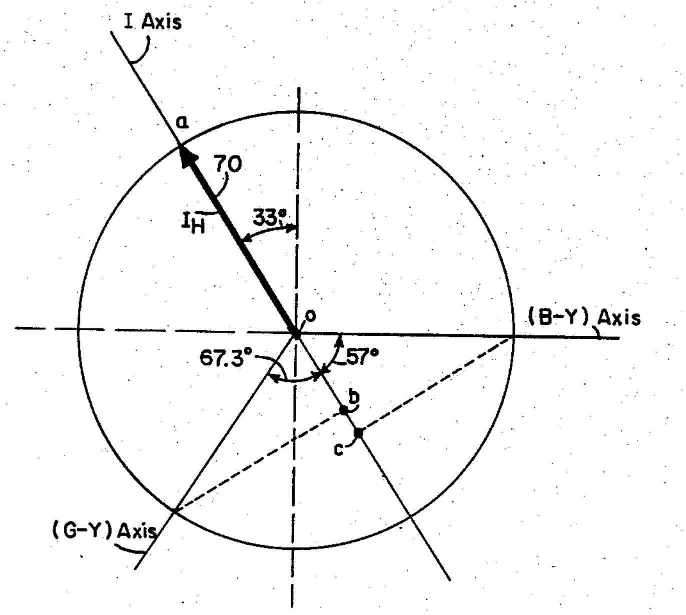
Figure 8B:
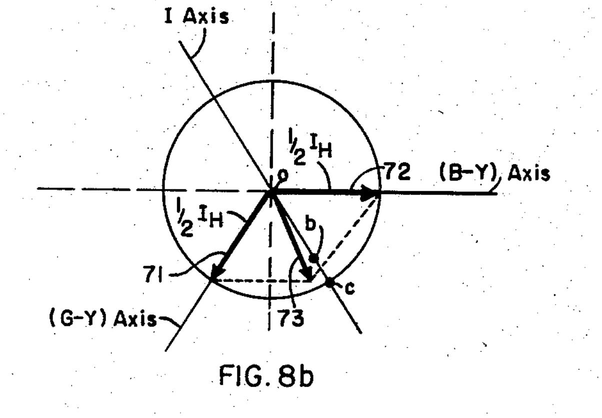

Referring to the drawings:

Fig. 1 is a circuit diagram, partly schematic, of a representative embodiment of a complete color-television receiver including a representative embodiment of a chrominance-signal demodulating system constructed in accordance with the present invention;

Figs. 2–6, inclusive, comprise graphs used in explaining the operation of the Fig. 1 receiver;

Fig. 7 is a circuit diagram, partly schematic, of a complete color-television receiver including a representative embodiment of a modified form of chrominance-signal demodulating system constructed in accordance with the present invention, and Figs. 8*a* and 8*b* are vector diagrams used in explaining the operation of the chrominance-signal demodulating system of Fig. 7.

*Description and operation of Fig. 1 color-television receiver*

Referring to Fig. 1 of the drawings, the color-television receiver there represented comprises an antenna system 10, 11 coupled to a carrier-signal translator 12 for supplying the received color-television signals thereto. The carrier-signal translator 12 is of conventional construction and may include, for example, a radio-frequency amplifier, an oscillator-modulator, and an intermediate-frequency amplifier for amplifying received color-television signals and changing the carrier frequency thereof to an intermediate-frequency value.

The intermediate-frequency signal from the carrier-signal translator 12 is, in turn, supplied to a detector and AGC circuit 13, of conventional construction, which is effective to remove the video- and sub-carrier frequency components from the intermediate-frequency signal and supply these components, which constitute a composite color signal including luminance, chrominance, and synchronizing information, to the output terminals thereof. The unit 13 is also effective to develop a control voltage representative of the amplitude of the carrier signal, which control voltage is fed back by way of conductor 14 for automatically controlling the gain of appropriate stages of the carrier-signal translator 12 in a conventional manner.

Also coupled to the output terminals of the carrier-signal translator 12 is a sound-signal translator 15 for separating, amplifying, and detecting the sound component of the intermediate-frequency signal. The sound-signal translator 15 is of conventional construction and may include, for example, a frequency-modulation detector and a suitable audio-frequency amplifier. The sound-signal translator 15 is, in turn, coupled to a loudspeaker 16 for converting the audio-frequency signals into audible sound signals.

The composite color signal from the detector of unit 13 is supplied to a deflection system 17 of conventional construction. Such deflection system may include, for example, a sync-separating circuit, a line-scanning generator, and a field-scanning generator which are responsive to the scanning synchronization component of the composite color signal for supplying synchronized line-scanning signals and synchronized field-scanning signals to the corresponding horizontal deflection winding 18 and vertical deflection winding 19 disposed adjacent the color-picture tube 20. In this manner, the electron beam of the picture tube 20 is caused to scan the phosphor screen thereof in a conventional manner. The picture tube 20 for reproducing the televised color image may be, for example, of the conventional three-gun shadow-mask type as shown.

Figure 2:
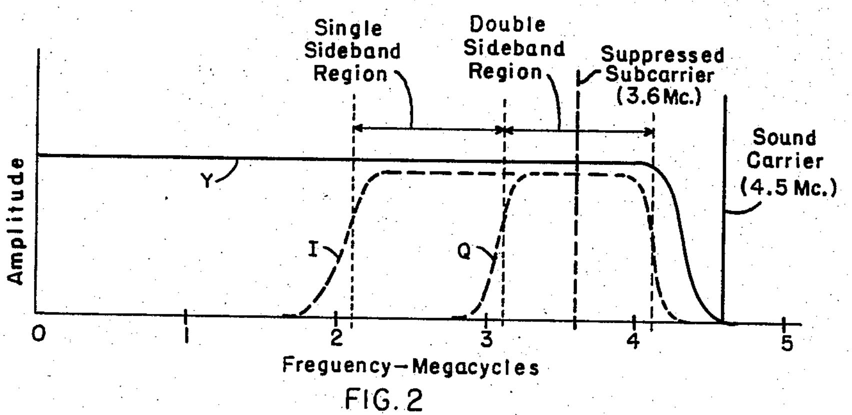

The nature and frequency distribution of the image information components of the composite color signal present at the output terminals of the detector 13 are indicated by the graph of Fig. 2. It should be noted that Fig. 2 shows only the frequency spectrum of the image information components and does not show the various synchronization components of the composite color signal. The luminance-signal component of the composite color signal is indicated by curve Y while the wide band I chrominance-signal component is indicated by curve I and the narrow band Q chrominance-signal component is indicated by curve Q. The single- and double-side-band regions of the chrominance-signal components are indicated. The portion of the I component occurring over the single-side-band region represents the high-frequency portion of the I color-difference signal, it being remembered that the frequency of the suppressed subcarrier corresponds to a video frequency of zero for the color-difference signals.

Coupled to the output terminals of the detector 13 is a luminance-signal amplifier 22, of conventional construction, for amplifying and translating the luminance-signal component Y of the composite color signal. The amplified luminance signal is, in turn, supplied by the luminance-signal amplifier 22 to the picture tube 20 for primarily controlling the luminance of the reproduced color image.

The composite color signal at the output terminals of the detector 13 is also supplied to a band-pass chrominance-signal amplifier 23 which serves to amplify and translate the signal components lying within the 2.0–4.2 megacycle range. In this manner, the subcarrier frequency chrominance signal is separated out from the major portion of the luminance signal and then supplied to a pair of synchronous detectors, namely, the I-signal synchronous detector 24 and the Q-signal synchronous detector 25.

The composite color signal from the detector 13 is additionally supplied to a stabilized subcarrier signal generator 26 which is responsive to the sync burst component of the composite color signal for generating a pair of synchronized subcarrier frequency reference signals at the subcarrier frequency of approximately 3.6 megacycles. The subcarrier signal generator 26 is of conventional construction and may include suitable phase-comparing, reactance-tube, oscillator, and phase-shift circuits for generating the desired subcarrier frequency reference signals. The subcarrier frequency reference signals from the generator 26 are, in turn, supplied to the synchronous detectors 24 and 25 for heterodyning with the subcarrier frequency chrominance signal to enable the I and Q color-difference modulation components to be separated out from the subcarrier frequency chrominance signal in the corresponding ones of the detectors 24 and 25. In the case of the Fig. 1 receiver, the two subcarrier frequency reference signals are made to be in phase quadrature with one another, that is, to differ in phase by 90° so that the I-signal synchronous detector 24 is effective to derive the I color-difference signal while the Q-signal synchronous detector 25 is effective to derive the Q color-difference signal.

The I and Q color-difference signals are then supplied by way of a cross-coupling circuit 27 constructed in accordance with the present invention, as will be more fully mentioned hereinafter, to a matrix circuit 28 of conventional construction. The matrix circuit 28 is effective, for example, to combine the I and Q color-difference signals in such proportions as to produce a red color-difference signal $(R-Y)$, a blue color-difference signal $(B-Y)$, and a green color-difference signal $(G-Y)$. These latter color-difference signals are then supplied to the various control electrodes of the picture tube 20. The picture tube 20 is effective to add these color-difference signals to the luminance signal (Y) supplied to the cathodes thereof, thereby producing the desired red, green, and blue control signals for controlling the color reproduction of the tube 20. As an alternative, the luminance signal may instead be supplied to the matrix 28 which is then designed to combine this luminance signal with the proper proportions of the I and Q color-difference signals to directly produce the red, green, and blue control signals, in which case the cathodes of the picture tube 20 may be effectively grounded. The choice of which of these modes of operation of the matrix 28 is to be utilized is immaterial in obtaining the benefits of the present invention.

Figure 3A:
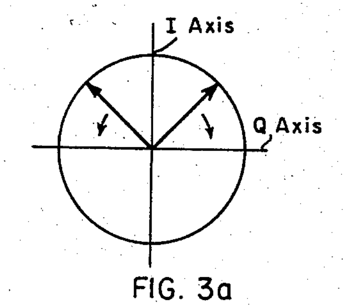
Figure 3B:
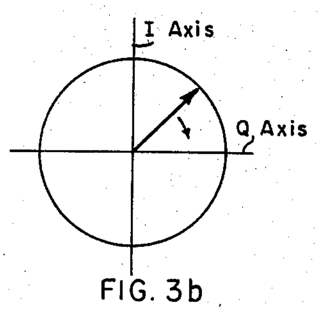

As mentioned, the fact that the high-frequency portion of the I color-difference signal is translated as a single-side-band signal gives rise to an undesired intermingling of I- and Q-signal components in the resultant I and Q color-difference signals at the output terminals of the synchronous detectors 24 and 25. This signal intermingling or distortion is commonly referred to as "color" or "quadrature" cross talk and is discussed in detail in an article entitled "Quadrature Cross Talk in NTSC Color Television" by Bailey and Hirsch, appearing on pages 84–90 of the January, 1954 issue of the Proceedings of the I. R. E. Briefly, however, the cause of this cross talk may be understood by reference to the vector diagrams of Figs. 3*a* and 3*b*. Fig. 3*a* represents the two rotating vector components which may be used to represent the two side-band components which result where a carrier signal is modulated by a single-frequency sinusoidal signal. See Radio Engineering, Terman, page 491 (1947 edition) for detailed discussion. The vector rotating in the counterclockwise sense represents the upper side-band vector which is continually advancing in phase relative to the subcarrier because of the higher frequency thereof. In a similar manner, the vector rotating in a clockwise sense represents the lower side-band component of the double-side-band signal and is continually falling back in phase relative to the subcarrier because of the lower frequency of this side-band component. Both vectors rotate with the same angular velocity but in opposite directions. From this it is apparent that the vectors for the double-side-band I component can contribute no signal along the Q axis because the Q axis components of the two rotating vectors are always equal in amplitude and opposite in phase, thus canceling one another. In a similar manner, the two side-band vectors for the Q signal start from the Q axis and, hence, contribute no signal along the I axis. Thus, by properly phasing the reference signals supplied to the synchronous detectors, the I and Q signals may be separated from one another provided such signals are transmitted in a double-side-band manner. The vector of Fig. 3*b* represents a single-side-band signal which, in the present environment, is the lower frequency side-band component of the I signal. It will be apparent that this single rotating vector produces equal signal components along both the I and Q axes, thus producing the undesired cross talk.

Figure 4:
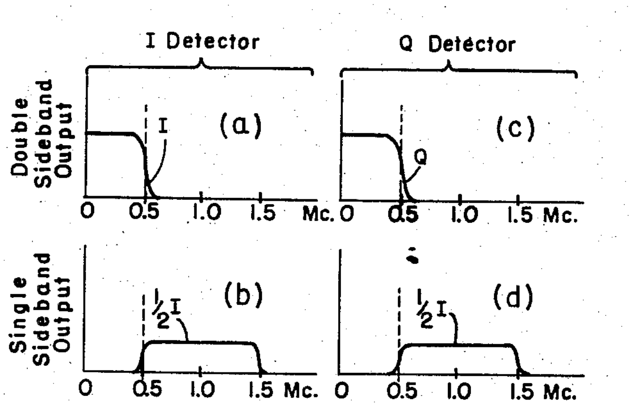

The curves of Fig. 4 show the resulting signal spectrums at the outputs of the I synchronous detector 24 and the Q synchronous detector 25. These curves are amplitude versus frequency curves for the resultant signals and are referenced to zero frequency because the synchronous detectors are effective to detect the subcarrier components or, in other words, to subtract the subcarrier frequency therefrom. The curve of Fig. 4(*a*) shows the I axis output of the I synchronous detector 24 over the 0–0.5 megacycle double-side-band range while the curve of Fig. 4(*b*) shows the I detector output for the 0.5–1.5 megacycle single-side-band range of the I signal. It will be noted that the lower frequency portion is of full amplitude while the high-frequency portion is of half amplitude. This results from the fact that the signal is divided equally between upper and lower side bands and, hence, transmission of only one side band reduces by one-half the amplitude of a detected output signal. In order that there be no distortion in the resulting color image, the high-frequency and low-frequency portions of the I signal must be of the same amplitude. Fig. 4(*c*) shows the low-frequency double-side-band Q axis output for the Q-signal synchronous detector 25 while Fig. 4(*d*) shows the high-frequency single-side-band output thereof. This high-frequency single-side-band output represented by Fig. 4(*d*) is a half amplitude I-signal component and represents undesired signal cross talk which will cause distortion of the reproduced image if not eliminated.

From the foregoing it will be seen that a signal transmitted in accordance with the signal specification approved by the Federal Communications Commission will, unless special precautions are taken, produce considerable distortion of the resultant color image at the receiver. The procedure heretofore proposed to prevent distortion is to pass the I color-difference signal through a circuit which is effective to boost the amplitude of the half amplitude high-frequency components thereof by a factor of two relative to the full amplitude low-frequency components. Also, in order to eliminate the cross talk shown in Fig. 4(*d*), it has been proposed to pass the Q color-difference signal through a 0–0.5 megacycle low-pass filter, thereby eliminating the undesired 0.5–1.5 megacycle cross-talk component. It will be noted that the curves of Fig. 4 are rather ideal in shape and, in practice, it is difficult to design circuits for giving the proposed boosting and cutoff characteristics without inducing a considerable amount of phase distortion. Also, in order to obtain full use of the high-frequency portion of the I color-difference signal when using previously proposed apparatus, it is necessary that the color receiver be designed for the proposed I–Q operation. As mentioned, other circuit economies are possible where other than the I and Q color-difference signals are derived.

One expedient that has been heretofore proposed is to pass the detected signals from both synchronous detectors through, for example, 0–0.5 megacycle low-pass filters for completely eliminating the high-frequency portion of the I signal, thereby eliminating cross talk with a minimum of circuit complexity. This method, however, is undesirable in that it also eliminates the high-frequency portion of the I signal which represents fine detail color information and which would increase the fine detail resolution of the reproduced color image.

The chrominance-signal demodulating system constructed in accordance with the invention proposes to circumvent these limitations by making use of a novel cross-coupling circuit for combining some of the I-signal information at the detector 24 output with the Q-signal information at the detector 25 output and vice versa, thereby considerably minimizing any signal excesses or deficiencies in either of the derived color-difference signals.

Figure 5:
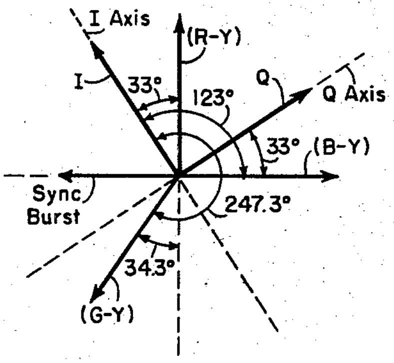
Figure 6:
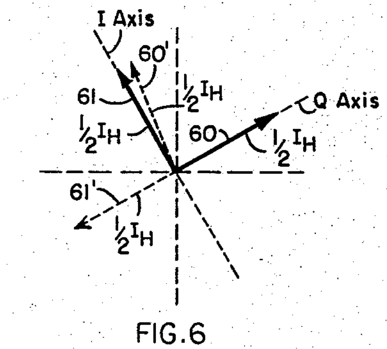

As is well known to those skilled in the art, the particular type of color-difference signal that may be obtained from the subcarrier frequency chrominance signal depends on the particular phase angle of the local subcarrier frequency reference signal injected into the synchronous detector relative to the subcarrier phase angles at which the signal components are encoded at the transmitter. Fig. 5 is a vector diagram showing various color-difference signals that may be obtained by operating a synchronous detector at the indicated phase angles relative to the phase of the sync burst signal as shown. Thus, it is apparent that, in addition to the I and Q color-difference signals, the R—Y, B—Y, and G—Y color-difference signals may be derived directly by suitably selecting the phase angles of the local reference signals injected into the receiver synchronous detectors. Fig. 5 is included for convenience in relating the phase angles of the I and Q color-difference signals to that of the sync burst signals in the usual manner. It will be mentioned, however, that in a mathematical derivation to be given hereinafter all phase angles are, for the convenience of the particular derivation, taken relative to the positive direction of the I-signal axis. The other color-difference signals shown in Fig. 5 will be discussed in greater detail in connection with the Fig. 7 embodiment of the invention. It should be noted that the other color-difference signals, for example, the R—Y signal, consist of a mixture of I and Q components of different band widths.

*Description of Fig. 1 chrominance-signal demodulating system*

Referring again to Fig. 1 of the drawings, there is shown a representative embodiment of a chrominance-signal demodulatnig system constructed in accordance with the present invention for developing the color information signals for driving the image-reproducing device or picture tube 20 of the color-television receiver there shown. As previously mentioned, the color information signals may be of either the R—Y, G—Y, B—Y form or the R, G, B form depending on whether it is desired to combine the luminance signal with the color-difference signals in the picture tube 20 or in the matrix 28.

The chrominance-signal demodulating system of the present invention includes circuit means for supplying a subcarrier frequency chrominance signal, the phase and amplitude of which are representative of the color content of the scene being televised. As mentioned, the subcarrier frequency chrominance signal is formed at the transmitter by combining a pair of quadrature-phased subcarrier signals one of which is modulated with a wide band width I color-difference component and the other with a narrow band-width Q color-difference component, the resultant chrominance signal being a signal which varies in both phase and amplitude. The circuit means included in the receiver of Fig. 1 for supplying such a subcarrier frequency chrominance signal includes, for example, band-pass chrominance-signal amplifier 23 as well as the circuits located ahead of this amplifier 23 for translating the received subcarrier frequency chrominance-signal component so that such signal component is supplied to the output terminals of the amplifier 23.

The chrominance-signal demodulating system of the present invention also includes detector circuit means responsive to the subcarrier frequency chrominance signal for deriving therefrom modulation components which represent first and second video-frequency color-difference signals which tend to be distorted. More specifically, such detector circuit means may include the first synchronous detector 24 responsive to the subcarrier frequency chrominance signal for deriving across the output terminals thereof a first color-difference signal which tends to be distorted and the second synchronous detector 25 responsive to the subcarrier frequency chrominance signal for deriving across the output terminals thereof a second color-difference signal which, likewise, tends to be distorted. In the case of the Fig. 1 receiver, where the local reference signals of subcarrier frequency which are injected into the synchronous detectors 24 and 25 are, for sake of example, selected to be in such phase relationship as to cause the detectors 24 and 25 to detect the chrominance-signal modulation components along the I and Q axes of the chrominance signal, the resultant signal at the output terminals of the synchronous detector 24 is the I color-difference signal while the resultant signal at the output terminals of the synchronous detector 25 is the Q color-difference signal. These color-difference signals are distorted in the same manner as was mentioned in connection with Fig. 4. That is, at the output terminals of the I-signal synchronous detector 24 the high-frequency portion of the I color-difference signal tends to be of half amplitude relative to the low-frequency portion thereof while the signal at the output terminals of the Q-signal synchronous detector 25 includes a half amplitude component corresponding to the high-frequency portion of the I color-difference signal phase-shifted by 90°.

The chrominance-signal demodulating system of the present invention further includes cross-coupling circuit means 27 for combining a portion of the first color-difference signal, in this case the I color-difference signal, with the second color-difference signal, in this case the Q color-difference signal, and a portion of the second with the first for minimizing any distortion present in either of the two color-difference signals. Such cross-coupling circuit means includes a first frequency-selective circuit 30 coupled to the output terminals of the first synchronous detector 24 for developing a signal representative of selected frequency components of the first, in this case the I, color-difference signal. Similarly, the cross-coupling circuit means 27 includes a second frequency-selective circuit 31 coupled to the output terminals of the second synchronous detector 25 for developing a signal representative of selected frequency components of the second, in this case the Q, color-difference signal.

The cross-coupling circuit means 27 also includes a first signal-adding circuit 32 coupled between the second frequency-selective circuit 31 and the output terminals of the first synchronous detector 24 for combining the selected frequency components of the second color-difference signal with the first color-difference signal for minimizing any distortion present in the first color-difference signal. Similarly, the cross-coupling circuit means 27 includes a second signal-adding circuit 33 coupled between the first frequency-selective circuit 30 and the output terminals of the second synchronous detector 25 for combining the selected frequency components of the first color-difference signal with the second color-difference signal for minimizing any distortion present in the second color-difference signal. Thus, it is apparent that it is intended to compensate for any signal errors at the output of either synchronous detector by combining therewith a portion of the output signal from the other synchronous detector. This cross-coupling compensation will be discussed in more detail presently.

As is indicated by the drawing designations, the first and second frequency-selective circuits 30 and 31 for developing signals representative of selected frequency components of the two color-difference signals also serve to shift the phase of these signals before they are combined with the color-difference signals occurring at the output terminals of the two synchronous detectors. For the case of operation with detection at I and Q, as is presently being discussed as an illustration of the Fig. 1 type of receiver, these circuits 30 and 31 are designed to shift the phase of the selected signals by a factor of 90°. Also, as the signal distortion or intermingling occurs only over the higher frequency 0.5–1.5 megacycle video-frequency range, these circuits 30 and 31 are further designed to respond only to this range of signal components in the two color-difference signals. A convenient circuit for producing 90° phase shift over a selected frequency range is a double-tuned coupled circuit and each of the circuits 30 and 31 may include such a double-tuned coupled circuit. Alternative ways of obtaining the desired phase shift, however, will be apparent to those skilled in the art.

The chrominance-signal demodulating system of the present invention additionally includes circuit means responsive to the two distortion-compensated color-difference signals for controlling the color reproduction of the image-reproducing device or picture tube 20. Such circuit means may include, for example, matrix circuit 28 which is responsive to the two I and Q color-difference signals for producing the desired $R-Y$, $G-Y$, and $B-Y$ color-difference signals which are then supplied to the control electrodes of the respective electron guns of the picture tube 20. It will be noted that the circuit means represented by the matrix 28 preferably has a flat amplitude versus frequency response characteristic over the useful frequency range thereof in order to introduce no distortion when combining the various portions of the I and Q color-difference signals. This is in contrast to the cross-coupling circuits of unit 27 which are deliberately made to be frequency selective in nature.

*Operation of Fig. 1 chrominance-signal demodulating system*

Considering now the operation of the chrominance-signal demodulating system just described, such a system, when constructed in accordance with the present invention, makes use of cross coupling of the detected color-difference signals of eliminate undesired signal distortion thereof.

The present invention proposes to eliminate undesired intermingling in the case, for example, of I–Q operation by selecting the undesired high-frequency I-signal component at the output of the Q-signal synchronous detector 25, shifting the phase thereof, and combining it with the corresponding high-frequency component at the output of the I-signal synchronous detector 24 in order to reproduce a full amplitude high-frequency component at the output of the I-signal detector 24 in a converse manner, the invention proposes to select the high-frequency portion of the I-signal component at the output of the I-signal spnchronous detector 24, shift the phase thereof, and combine it with the signal at the output of the Q-signal synchronous detector 25 so that the high-frequency components cancel one another so that only the desired low-frequency Q-signal components are present at the output of the Q-signal synchronous detector 25. This operation is indicated by the vector diagram of Fig. 6 wherein the vector 60 represents the undesired I component at the output of the Q-signal synchronous detector 25 which is shifted in phase by 90° to correspond with the dashed line vector 60' and is then combined with the high-frequency I-signal component, represented by the vector 61, to produce a full amplitude high-frequency component at the output of the I-signal synchronous detector 24. In a similar manner, the high-frequency I-signal component at the output of detector 24, represented by the vector 61, is shifted in phase by 90° to develop the dashed line vector 61' which is then combined with the high-frequency I-signal component represented by the vector 60 in order to cancel the high-frequency I-signal component occurring at the output of the Q-signal synchronous detector 25.

The invention, however, is not limited to chrominance-signal demodulating systems which are designed for I–Q operation and, accordingly, a general mathematical expression has been derived which enables the amount of phase shift required in the phase-shift circuits 30 and 31 to be readily determined for other than I–Q operation. As mentioned, there are other advantages that arise where other than the I–Q type operation is utilized and, accordingly, the derivation of the general mathematical expression for the required phase shift will now be described and the application of such expression to other than I–Q operation will be considered.

In order to obtain a general expression for the amount of phase shift required in the cross-coupling networks, it is necessary to consider briefly the manner in which the subcarrier frequency chrominance signal is developed at the transmitter. As previously mentioned, the subcarrier frequency chrominance signal is made up of a pair of modulation components, one of which represents the wide band-width I color-difference signal while the other represents the narrow band-width Q color-difference signal. The I color-difference signal may be represented by terms of the following form:

$$E_I=2I_L \sin \omega_1 t+2I_H \sin \omega_2 t \qquad (1)$$

where $E_I$=I color-difference signal which is to be modulated onto the subcarrier signal $I_L$=amplitude of a low-frequency I-signal component of angular velocity $\omega_1$ $I_H$=amplitude of a high-frequency I-signal component of angular velocity $\omega_2$.

The direct-current component may be neglected for the present discussion. By using the separate $I_L$ and $I_H$ terms to illustrate the operation on the total signal, it is possible to keep the two components separate, thereby enabling determination of the compensation needed for the high-frequency component $I_H$. In a similar manner, the narrow band Q color-difference signal may be represented by the following expression:

$$E_Q=2Q \sin \omega_3 t \qquad (2)$$

where $E_Q$=Q color-difference signal which is to be modulated onto a quadrature-phased subcarrier signal $Q$=amplitude of a low-frequency Q-signal component of angular velocity $\omega_3$.

The two quadrature-phase subcarriers upon which the signals represented by Equations 1 and 2 are to be encoded may be represented by the following expressions:

$$e_I=E_O \sin \omega t \qquad (3)$$

$$e_Q=E_O \cos \omega t \qquad (4)$$

where $\omega$=angular subcarrier frequency (approximately 3.6 megacycles). In this manner, the modulated subcarrier signal $e_I$ for the I-signal component is represented by the following expression:

$$e_I=(E_O+E_I) \sin \omega t \qquad (5)$$

Substituting the expression of Equation 1 into Equation 5 and expanding the results by means of the trigonometric identity for the product of two sine terms results in the following expression:

$$e_I=E_O \sin \omega t+I_L \cos (\omega-\omega_1)t-I_L \cos (\omega+\omega_1)t+ I_H \cos (\omega-\omega_2)t-I_H \cos (\omega+\omega_2)t \qquad (6)$$

The first term of angular velocity $\omega$ represents the subcarrier signal. The second term of angular velocity $\omega-\omega_1$ represents the lower side-band component for the low-frequency modulation signal $I_L$ while the third term of angular velocity $\omega+\omega_1$ represents the upper side-band term for the low-frequency modulation component $I_L$. In the same manner, the last two terms represent, respectively, the lower and upper side-band signals for the high-frequency modulation component $I_H$. In accordance with current practice, the subcarrier signal as represented by the first term is eliminated by suitable modulator circuitry such as, for example, by using a balanced modulator which serves to suppress the subcarrier except when $E_I$ and $E_Q$ have direct-current terms. Also, as mentioned, the upper side-band portion of the high-frequency modulation component $I_H$, which is represented by the last term of Equation 6, is eliminated by suitable filter circuits in the transmitter which are used to shape the frequency pass band of the transmitted signal.

The modulated carrier signal for the Q modulation component is given by the following expression:

$$e_Q=(E_O+E_Q) \cos \omega t \qquad (7)$$

Substituting the value of $E_Q$ from Equation 2 into Equation 7 and expanding by means of the mentioned trigonometric identity results in the following expression:

$$e_Q = E_O \cos \omega t + Q \sin (\omega + \omega_3)t - Q \sin (\omega - \omega_3)t \quad (8)$$

As before, the first term of angular velocity $\omega$ similarly represents the subcarrier and is suppressed at the transmitter by using a modulator of the balanced modulator type.

The two modulated subcarrier signals at the transmitter are combined or added together to produce a resulting subcarrier frequency chrominance signal "$e$" represented by the following expression:

$$e = e_I + e_Q \quad (9)$$

Substituting the values of $e_I$ and $e_Q$ of Equations 6 and 8 into Equation 9 and omitting hte terms that represent signal components which are suppressed at the transmitter results in the following expression which represents the transmitted subcarrier frequency chrominance signal except for direct-current component or average color which are omitted here for simplicity:

$$e = I_L \cos (\omega - \omega_1)t - I_L \cos (\omega + \omega_1)t + I_H \cos (\omega - \omega_2)t + Q \sin (\omega + \omega_3)t - Q \sin (\omega - \omega_3)t \quad (10)$$

This resulting signal represented by Equation 10 is supplied to the two synchronous detectors 24 and 25 of, for example, the Fig. 1 receiver by way of the chrominance-signal amplifier 23 as previously mentioned.

Now each of the synchronous detectors at the receiver constitutes a product modulator which serves to multiply the input chrominance signal by the locally injected subcarrier frequency reference signal, thereby producing an output which is represented by the product of the mathematical expressions for the input and locally injected signals. In order to keep the remainder of the derivation perfectly general, therefore, the equations for the two locally generated reference signals injected into the two synchronous detectors are represented as follows:

$$e_\alpha = \sin (\omega t + \alpha) \quad (11)$$

$$e_\beta = \sin (\omega t + \beta) \quad (12)$$

where $e_\alpha$ is the signal injected into the first synchronous detector 24 and has a phase angle $\alpha$ relative to the phase of the original subcarrier signal upon which the I modulation component was encoded. (See Equation 6.) Similarly, $e_\beta$ represents the local reference signal injected into the second synchronous detector 25 and, again, the phase angle $\beta$ is taken relative to the phase of the subcarrier upon which the I modulation component was encoded. In other words, with reference to the vector diagram of Fig. 5, all phase angles for the locally injected signals are taken relative to the positive direction of the I axis thereof.

As mentioned, the output signals from the synchronous detectors correspond to the product of the input chrominance signal and the locally injected signals and, accordingly, the expressions for the corresponding output signals $E_\alpha$ and $E_\beta$ are represented by the following expressions:

$$E_\alpha = k(e)(e_\alpha) \quad (13)$$

$$E_\beta = k(e)(e_\beta) \quad (14)$$

where $k$=amplification factor of the synchronous detectors.

Carrying out the indicated multiplication of Equation 13 by inserting Equations 10 and 11 into Equation 13, omitting all terms representing signals of frequency $2\omega$, assuming the synchronous detectors to have unity gain ($k=1$), and simplifying, results in the following expression for the output signal $E_\alpha$ from the synchronous detector 24:

$$E_\alpha = \tfrac{1}{2} I_L \sin (\omega_1 t + \alpha) + \tfrac{1}{2} I_L \sin (\omega_1 t - \alpha) + \tfrac{1}{2} I_H \sin (\omega_2 t + \alpha) + \tfrac{1}{2} Q \cos (\omega_3 t - \alpha) - \tfrac{1}{2} Q \cos (\omega_3 t + \alpha) \quad (15)$$

The terms containing an angular frequency of $2\omega$ represent undesired second harmonic terms produced within the synchronous detector during the multiplication process and are eliminated by a suitable filter circuit associated with the synchronous detector, hence, their omission from the expression of Equation 15. Simplifying still further, by applying the sine product trigonometric identity in reverse results in the following expression for the output signal $E_\alpha$:

$$E_\alpha = I_L \sin \omega_1 t \cos \alpha + \tfrac{1}{2} I_H \sin (\omega_2 t + \alpha) + Q \sin \omega_3 t \sin \alpha \quad (16)$$

This expression of Equation 16 represents the color-difference signal at the output of the synchronous detector 24.

Similarly, the expression for the output signal $E_\beta$ occurring at the output terminals of the second synchronous detector 25 is represented by the following expression:

$$E_\beta = I_L \sin \omega_1 t \cos \beta + \tfrac{1}{2} I_H \sin (\omega_2 t + \beta) + Q \sin \omega_3 t \sin \beta \quad (17)$$

It will be noted that this expression is the same as that of Equation 16 except for the phase angles $\beta$.

Now, for an ideal signal at the output terminals of the first synchronous detector 24, the $I_H$ term should be of the same form as the $I_L$ term which represents the output for a double-side-band signal. In other words, the $I_H$ term of Equation 16 should be of the form:

$$I_H \sin \omega_2 t \cos \alpha \quad (18)$$

in order that no distortion of the reproduced color image be present.

As was stated earlier, the distortion can be eliminated by cross-coupling a phase-shifted portion of the $I_H$ term occurring at the output of the second synchronous detector 25 as indicated in Equation 17. When this phase-shifted term is combined with the $I_H$ term previously presented at the output of the first synchronous detector 24 by way of, for example, the adding circuit 32, the resulting $I_H$ component at the output of the adding circuit 32 is represented by the following expression:

$$\tfrac{1}{2} I_H \sin (\omega_2 t + \alpha) + \tfrac{1}{2} I_H \sin (\omega_2 t + \beta + \theta) \quad (19)$$

where $\theta$=phase shift introduced by the phase-shift circuit 31. The expression of Equation 19 may be modified by adding and subtracting $\alpha$ from the second term as indicated in the following expression:

$$\tfrac{1}{2} I_H \sin (\omega_2 t + \alpha) + \tfrac{1}{2} I_H \sin [(\omega_2 t - \alpha) + (\alpha + \beta + \theta)] \quad (20)$$

Now, if the following relationship is made to occur:

$$(\alpha + \beta + \theta) = 0 \quad (21)$$

then Equation 20 may be reduced to the form:

$$I_H \sin \omega_2 t \cos \alpha \quad (22)$$

which represents the desired form for the $I_H$ component at the output of the first synchronous detector 24. In other words, this is the form which the high-frequency modulation component $I_H$ would take if it had been transmitted as a double-side-band signal in the first place. Thus, the condition for eliminating distortion in the output signal from the first synchronous detector 24 is represented by the following expression:

$$\theta = -(\alpha + \beta) \quad (23)$$

Similar considerations will show that this phase shift $\theta$ is also that which is required to cause an elimination of the distortion, that is, the departure from the ideal or double-side-band value, for the $I_H$ component at the output of the second synchronous detector 25.

Applying the foregoing results to the case for I–Q operation of the synchronous detectors as is shown in Fig. 1, then:

$$\left.\begin{array}{l} \alpha = 0 \\ \beta = 90° \\ \theta = 90° \end{array}\right\} \quad (24)$$

Substituting the expressions for $\alpha$ and $\beta$ of Equation 24 into Equations 16 and 17 gives the following expressions for the signal $(E_\alpha)_I$ at the output of synchronous detector 24 and the signal $(E_\beta)_Q$ at the output of the synchronous detector 25:

$$(E_\alpha)_I = I_L \sin \omega_1 t + \tfrac{1}{2} I_H \sin \omega_2 t \qquad (25)$$

$$(E_\beta)_Q = Q \sin \omega_3 t + \tfrac{1}{2} I_H \sin (\omega_2 t + 90^\circ) \qquad (26)$$

Cross-coupling a replica of the $I_H$ term at the output of the Q detector 25 which has been phase-shifted by $-90^\circ$ gives the following expression for the sum of the resulting $I_H$ term at the output of the adding circuit 32:

$$\tfrac{1}{2} I_H \sin \omega_2 t + \tfrac{1}{2} I_H \sin (\omega_2 t + 90^\circ - 90^\circ) \qquad (27)$$

This, of course, reduces to:

$$I_H \sin \omega_2 t \qquad (28)$$

which represents a modulation component $I_H$ of full amplitude relative to the low-frequency modulation component $I_L$ of Equation 25 and, hence, is the desired distortionless value for this $I_H$ component.

Similarly, cross-coupling a 90° phase-shifted replica of the $I_H$ component at the output of the I detector 24 and combining it with the signal from the Q detector 25 in the adding circuit 33 gives the following expression for the sum of the high-frequency $I_H$ components:

$$\tfrac{1}{2} I_H \sin (\omega_2 t + 90^\circ) + \tfrac{1}{2} I_H \sin (\omega_2 t - 90^\circ) \qquad (29)$$

By means of the trigonometric identity for the product of two sinusoidal functions, this reduces to:

$$I_H \sin \omega_2 t \cos 90^\circ = 0 \qquad (30)$$

which, as indicated, is equal to zero which, as previously mentioned, is the desired result.

From the foregoing, it will be apparent that cross-coupling signal components from one synchronous detector output, phase-shifting these components in accordance with the expression of Equation 23, and then combining the phase-shifted components with the signal from the other synchronous detector serve to eliminate any distortion of the resulting detected color-difference signals due to single-side-band transmission of the high-frequency portion of the I color-difference signal. The foregoing derivation was perfectly general with regard to the phase angles $\alpha$ and $\beta$ at which the two synchronous detectors are operated so that the relationship of Equation 23 also applies where signals are detected at other than the I and Q color-difference angles. In other words, by using the cross-coupling circuit 27, with the phase shifters 30 and 31 adjusted to provide the proper phase shift indicated by Equation 23, any desired color-difference signals may be derived without introducing undesired quadrature cross talk. At the same time, the benefits of wide band operation, that is, operation utilizing the high-frequency portion of the I color-difference signal, are obtained because the high-frequency components of the I color-difference signal are not eliminated as was previously done in some types of chrominance demodulating systems heretofore proposed.

The use of cross-coupling networks in accordance with the present invention enables other than the I and Q color-difference signals to be derived without introducing undesired signal distortion. As an example of this feature of the invention, the case where it is desired to derive directly the red color-difference signal $(R-Y)$ and the blue color-difference signal $(B-Y)$ will be briefly considered. Reference to Fig. 5 indicates the phase relationship of the $(R-Y)$ and $(B-Y)$ color-difference signals with respect to the I and Q color-difference signals and, hence, indicates the phase angle at which the synchronous detectors 24 and 25 must be operated in order to derive the $(R-Y)$ and $(B-Y)$ color-difference signals. In this manner, the phase angle $\alpha$ of the local reference signal supplied to, for example, the synchronous detector 24 should be 33° while the phase angle $\beta$ of the signal supplied to the synchronous detector 25 should be 123°, it being remembered that the positive direction of the I axis is taken as being zero phase. When the locally injected subcarrier frequency reference signals are made to have these phase angles, then the $(R-Y)$ and $(B-Y)$ color-difference signals are the color-difference signals which are developed at the output terminals of the synchronous detectors 24 and 25, respectively. At this point, however, the signals are distorted due to the mentioned quadrature cross talk. This distortion is then eliminated by the cross-coupling circuit means 27 and the distortion-compensated color-difference signals are, in turn, supplied to the matrix 28. As indicated by Equation 23, the phase shift required in the phase-shift circuits 30 and 31 is $-156^\circ$. Also, because the $(R-Y)$ and $(B-Y)$ color-difference signals are now present at the input to the matrix 28, this matrix may now be of a much more simplified form. More specifically, the matrix 28 may be designed to directly translate the $(R-Y)$ and $(B-Y)$ color-difference signals while, at the same time, combining portions of these two signals in a simple adding circuit to produce the green color-difference signal $(G-Y)$. From the foregoing it is apparent that the cross-coupling technique of the present invention enables wide band operation of the chrominance-signal demodulating system at other than the I and Q detection angles without introducing undesired cross talk.

*Description of Fig. 7 chrominance-signal demodulating system*

Referring now to Fig. 7 of the drawings, there is shown a complete color-television receiver like the one of Fig. 1 but including a representative embodiment of a modified form of chrominance-signal demodulating system constructed in accordance with the present invention. Similar units are denoted by the same reference numerals in both Figs. 1 and 7. The modified chrominance-signal demodulating system of Fig. 7 represents an attractive system of relatively simple and economical construction. Such a system includes circuit means for supplying a subcarrier frequency chrominance signal composed of a wide band-width I color-difference modulation component and a narrow band-width Q color-difference modulation component, the phase and amplitude of the resultant chrominance signal being representative of the color content of the scene being televised. As before, this supply-circuit means may include the chrominance-signal amplifier 23 and the circuits ahead of the chrominance amplifier 23 which are effective to translate the subcarrier frequency chrominance signal to the output terminals thereof.

The chrominance-signal demodulating system of Fig. 7 also includes detector circuit means comprising, for example, a first synchronous detector circuit represented by the pentode tube 24' which is responsive to the subcarrier frequency chrominance signal for deriving across the output terminals thereof the blue color-difference signal $(B-Y)$ of which the high-frequency I-signal component tends to be of improper phase and amplitude. This detector circuit means may also include a second synchronous detector circuit represented by the pentode tube 25' which is responsive to the subcarrier frequency chrominance signal for deriving across the output terminals thereof the green color-difference signal $(G-Y)$ of which the high-frequency I-signal component tends to be of improper phase and amplitude.

The chrominance-signal demodulating system of Fig. 7 also includes cross-coupling circuit means 27' for combining a portion of the $(B-Y)$ color-difference signal with the $(G-Y)$ color-difference signal and, conversely, a portion of the $(G-Y)$ with the $(B-Y)$ for minimizing any distortion present in either of these color-difference signals. This cross-coupling circuit means is indicated by the networks within the dashed line box 27' and may include, for example, a first tuned circuit 40 having a pass band corresponding to the frequency range of the high-frequency portion of the I-signal component and coupled to the output terminals of both the first and second synchronous detector circuits 24' and 25' for developing and combining signals representative of the high-frequency I-signal components of both the $(B-Y)$ and the $(G-Y)$ color-difference signals. In addition, the cross-coupling circuit means 27' may also include a second tuned circuit 43 having a pass band corresponding to the frequency range of the low-frequency portion of the $(B-Y)$ color-difference signal and coupled between the first tuned circuit 40 and the output terminals of the first synchronous detector circuit 24' for combining the high-frequency I signal developed across the first tuned circuit 40 with the low-frequency portion of the $(B-Y)$ color-difference signal for developing a compensated $(B-Y)$ color-difference signal wherein the phase and amplitude of the high-frequency I-signal component are improved. In a similar manner, the cross-coupling circuit means 27' may include a third tuned circuit 44 having a pass band corresponding to the frequency range of the low-frequency portion of the $(G-Y)$ color-difference signal and coupled between the first tuned circuit 40 and the output terminals of the second synchronous detector circuit 25' for combining the high-frequency I signal developed across the first tuned circuit 40 with the low-frequency portion of the $(G-Y)$ color-difference signal for developing a compensated $(G-Y)$ color-difference signal wherein the phase and amplitude of the high-frequency I-signal component are improved. As shown in the drawings, the first tuned circuit 40 may include a pair of series-connected tuned circuits 41 and 42. The use of more than one tuned circuit affords a composite pass-band characteristic having sharper frequency cutoff characteristics at the extremities of the pass band.

The chrominance-signal demodulating system of Fig. 7 also includes circuit means responsive to the two distortion-compensated color-difference signals for controlling the color reproduction of the image-reproducing device or picture tube 20. More specifically, this circuit means may take the form of a matrix circuit 28' for translating the two distortion-compensated $(B-Y)$ and $(G-Y)$ color-difference signals and for combining portions of these signals to develop the red color-difference signal $(R-Y)$, the $(R-Y)$, $(B-Y)$, and $(G-Y)$ color-difference signals being capable of controlling the color reproduction of the image-reproducing device 20. In order to develop the $(R-Y)$ color-difference signal, the matrix circuit 28' includes, for example, adding resistors 50, 51, and 52 for adding portions of the $(B-Y)$ and $(G-Y)$ color-difference signals in accordance with the following relationship:

$$(R-Y)=-[0.384(B-Y)+1.97(G-Y)] \quad (31)$$

The phase of the combined components across the resistor 52 may be inverted by use of the tube 53 in order to supply the minus sign required by the expression of Equation 31. As indicated in the drawings, decoupling inductors 55, 56, and 57 may be utilized in order to minimize the effect of distributed capacitance associated with the picture tube 20 so as not to upset the operation of the synchronous detectors 24' and 25' and the cross-coupling circuit means 27'. Where the amplitude of the color-difference signals at the output terminals of the matrix 28' is not sufficient to drive satisfactorily the picture tube 20, suitable amplifier circuit means (not shown) may be interposed between each of these output terminals and the corresponding electrodes of the picture tube 20 for affording amplification of the three color-difference signals.

*Operation of Fig. 7 chrominance-signal demodulating system*

Considering now the operation of the simplified form of chrominance-signal demodulating system just described in Fig. 7, it will be apparent that the chrominance-signal amplifier 23 is effective to supply a subcarrier frequency chrominance signal having I and Q modulation components to the synchronous detectors 24' and 25'. Also, as indicated, the synchronous detectors 24' and 25' are operated so as to derive the $(B-Y)$ and $(G-Y)$ color-difference signals. The phase angles required of the two locally injected subcarrier frequency reference signals are indicated by the vector diagram of Fig. 5 from which it follows that:

$$\left.\begin{aligned}\alpha&=123^\circ\\ \beta&=247.3^\circ\\ \theta&=370.3^\circ\end{aligned}\right\} \quad (32)$$

where $\alpha$ is the phase angle of the local signal injected into the detector 24' while $\beta$ is the phase angle required of the local signal injected into the second detector 25'. As is apparent, the phase shift $\theta$ required of the cross-coupling networks of the cross-coupling circuit means 27' is very nearly equal to the 360°. Thus, by assuming that the required phase shift is equal to 360°, this leads to a simplified form of circuitry for the cross-coupling circuit means 27'. This, of course, results from the fact that 360° of phase shift is electrically the same as no phase shift so that no phase-shifting circuits need be used in the cross-coupling circuit means 27'.

The operation of the cross-coupling circuit means 27' shall now be described with reference to the vector diagrams of Figs. 8*a* and 8*b*. Fig. 8*a* represents an ideal situation for the case where the high-frequency portion $I_H$ of the I modulation component is transmitted as a double-side-band signal. In this case, the vector 70 of amplitude $\overline{a-o}$ represents the assumed double-side-band $I_H$ modulation component as supplied to the input terminals of the two synchronous detectors 24' and 25'. As mentioned in connection with Equation 18, the corresponding output signals at the output of the two synchronous detectors 24' and 25' are of the form:

$$I_H \sin \omega_2 t \cos \alpha \quad (33)$$

for the case of a double-side-band signal. As a result, the $I_H$ signal component at the output of the $(G-Y)$ synchronous detector 25' is represented by a vector of magnitude $\overline{o-b}$ lying along the I axis in the negative direction thereof while the $I_H$ component at the output of the $(B-Y)$ synchronous detector 24' is represented by a vector of magnitude $\overline{o-c}$ also lying along the I axis in the negative direction thereof. In order to avoid confusion, only the terminal points of these last two vectors have been indicated on the diagram of Fig. 8*a*. As mentioned, these output components represent the ideal output signals that would occur if the high-frequency $I_H$ component had been transmitted in a double-side-band manner. As previously mentioned, this $I_H$ component is not transmitted as a double-side-band signal but rather is transmitted as a single-side-band signal.

Referring now to the vector diagram of Fig. 8*b*, there is shown the actual output signals resulting from single-side-band transmission of the $I_H$ component and the resulting combination of the two in the cross-coupling circuit means 27'. More specifically, the single-side-band $I_H$ component is effective to produce a signal represented by vector 71 at the output of the $(G-Y)$ synchronous detector 25'. In a similar manner, the single-side-band component is effective to produce a signal as represented by vector 72 at the output of the $(B-Y)$ synchronous detector 24'. These signals are supplied to the cross-coupling means 27' wherein they appear across only the tuned circuit 40 as this tuned circuit is the only one which is tuned to the frequency range of the high-frequency $I_H$ component. In other words, these two half amplitude $I_H$ components, as represented by the vectors 71 and 72 of Fig. 8*b*, are combined across the tuned circuit 40 to produce a resultant signal having phase and amplitude as represented by the vector 73 of Fig. 8*b*. This resultant signal is then combined with or added to the low-frequency portions of each of the $(B-Y)$ and $(G-Y)$ color-difference signals which are developed across the tuned circuits 43 and 44, respectively, due to the series connection of the pairs of tuned circuits 40—43 and 40—44. In other words, this resultant signal serves as the high-frequency portion of both color-difference signals. That this is permissible may be seen by comparing the vector 73 with the ideal vector components $\overline{o-b}$ and $\overline{o-c}$ which would have been produced had the ideal double-side-band signal, which produces no distortion, been transmitted in the first place. It will be noted that a slight error does occur in both of the resulting color-difference signals. This, of course, arises from the original assumption that 360° of phase shift was the proper amount for the cross-coupling networks of the cross-coupling means 27'. As is apparent, however, this error is slight in magnitude and the resulting distortion on the reproduced color image will not be noticeable to the human eye.

From the foregoing descriptions of the various embodiments of the invention, it will be apparent that a chrominance-signal demodulating system constructed in accordance with the present invention represents a new and improved system for obtaining wide band color operation of a color receiver without introducing undesired distortion or color cross talk. This is particularly important where large sized picture tubes are utilized because such tubes require increased amounts of color detail information in order to produce a pleasing image. Also, a system in accordance with the present invention enables operation at other than the I and Q detection angles without introducing undesired cross-talk distortion. This, in turn, leads to other circuit economies such as, for example, a much simpler form of matrix for combining the derived color-difference signals.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A chrominance-signal demodulating system for developing the color information signals for driving the image-reproducing device of a color-television receiver, the system comprising: circuit means for supplying a subcarrier frequency chrominance signal, the phase and amplitude of which are representative of the color content of the scene being televised; detector circuit means responsive to the subcarrier frequency chrominance signal for deriving therefrom modulation components which represent first and second video-frequency color-difference signals which tend to be distorted; cross-coupling circuit means for combining a portion of the first color-difference signal with the second and a portion of the second with the first for minimizing any distortion present in either of the color-difference signals; and a matrix circuit responsive to the two distortion-compensated color-difference signals for producing the desired color information signals for driving the image-reproducing device.

2. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; detector circuit means responsive to the subcarrier frequency chrominance signal for deriving therefrom modulation components which represent first and second video-frequency color-difference signals which tend to be distorted; frequency-selective cross-coupling circuit means for combining selected frequency components of the first color-difference signal with the second and selected frequency components of the second with the first for minimizing any distortion present in either of the color-difference signals; and circuit means responsive to the two distortion-compensated color-difference signals for controlling the color reproduction of the image-reproducing device.

3. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; a pair of synchronous detectors individually responsive to the subcarrier frequency chrominance signal for deriving therefrom corresponding modulation components which represent first and second video-frequency color-difference signals which tend to be distorted; frequency-selective cross-coupling circuit means for combining selected frequency components of the first color-difference signal with the second and selected frequency components of the second with the first for minimizing any distortion present in either of the color-difference signals; and circuit means responsive to the two distortion-compensated color-difference signals for controlling the color reproduction of the image-reproducing device.

4. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; detector circuit means responsive to the subcarrier frequency chrominance signal for deriving therefrom modulation components which represent first and second video-frequency color-difference signals which tend to have intermingled frequency components; frequency-selective cross-coupling circuit means for combining selected frequency components of the first color-difference signal with the second and selected frequency components of the second with the first for correcting any undesired amplitude or phase variations in either of the color-difference signals resulting from intermingled frequency components; and circuit means responsive to the two distortion-compensated color-difference signals for controlling the color reproduction of the image-reproducing device.

5. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are respresentative of the color content of the scene being televised; detector circuit means responsive to the subcarrier frequency chrominance signal for deriving therefrom modulation components which represent first and second video-frequency color-difference signals which tend to be distorted; frequency-selective cross-coupling circuit means for combining a predetermined range of frequency components of the first color-difference signal with the second and the same predetermined range of frequency components of the second with the first for minimizing any distortion present in either of the color-difference signals; and circuit means responsive to the two distortion-compensated color-difference signals for controlling the color reproduction of the image-reproducing device.

6. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; detector circuit means responsive to the subcarrier frequency chrominance signal for deriving therefrom modulation components which represent first and second video-frequency color-difference signals which tend to be distorted; a first frequency-selective phase-shift network for shifting the phase of selected frequency components of the first color-difference signal and combining these phase-shifted components with the second color-difference signal for minimizing any distortion present in the second color-difference signal; a second frequency-selective phase-shift network for shifting the phase of selected frequency components of the second color-difference signal and combining these phase-shifted comopnents with the first color-difference signal for minimizing any distortion present in the first color-difference signal; and circuit means responsive to the two distortion-compensated color-difference signals for controlling the color reproduction of the image-reproducing device.

7. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; detector circuit means responsive to the subcarrier frequency chrominance signal for deriving therefrom modulation components which represent first and second video-frequency color-difference signals which tend to be distorted; frequency-selective cross-coupling circuit means for combining selected frequency components of the first color-difference signal with the second and selected frequency components of the second with the first for minimizing any distortion present in either of the color-difference signals; and a matrix circuit having a flat amplitude versus frequency-response characteristic over and useful video-frequency range thereof and responsive to the two distortion-compensated color-difference signals for developing the color information signal required for driving the image-reproducing device.

8. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; a first synchronous detector circuit responsive to the subcarrier frequency chrominance signal for deriving across the output terminals thereof a first color-difference signal which tends to be distorted; a second synchronous detector circuit responsive to the subcarrier frequency chrominance signal for deriving across the output terminals thereof a second color-difference signal which tends to be distorted; a first frequency-selective circuit coupled to the output terminals of the first synchronous detector circuit for developing a signal representative of selected frequency components of the first color-difference signal; a second frequency-selective circuit coupled to the output terminals of the second synchronous detector circuit for developing a signal representative of selected frequency components of the second color-difference signal; a first signal-adding circuit coupled between the second frequency-selective circuit and the output terminals of the first synchronous detector circuit for combining the selected frequency components of the second color-difference signal with the first color-difference signal for minimizing any distortion present in the first color-difference signal; a second signal-adding circuit coupled between the first frequency-selective circuit and the output terminals of the second synchronous detector circuit for combining the selected frequency components of the first color-difference signal with the second color-difference signal for minimizing any distortion present in the second color-difference signal; and circuit means responsive to the two distortion-compensated color-difference signals for controlling the color reproduction of the image-reproducing device.

9. A chrominance-signal demodulation system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; a first synchronous detector circuit responsive to the subcarrier frequency chrominance signal for deriving across the output terminals thereof a first color-difference signal which tends to be distorted; a second synchronous detector circuit responsive to the subcarrier frequency chrominance signal for deriving across the output terminals thereof a second color-difference signal which tends to be distorted; a first frequency-selective phase-shift network coupled to the output terminals of the first synchronous detector circuit for developing a signal representative of a predetermined range of frequency components of the first color-difference signal, the phase of these components being shifted a predetermined amount relative to the phase of the corresponding components of the first color-difference signal; a second frequency-selective phase-shift network coupled to the output terminals of the second synchronous detector circuit for developing a signal representative of the same predetermined range of frequency components of the second color-difference signal, the phase of these components being shifted by said predetermined amount relative to the phase of the corresponding components of the second color-difference signal; a first signal-adding circuit coupled between the second frequency-selective circuit and the output terminals of the first synchronous detector circuit for combining the phase-shifted components of the second color-difference signal with the first color-difference signal for minimizing any distortion present in the first color-difference signal; a second signal-adding circuit coupled between the first frequency-selective circuit and the output terminals of the second synchronous detector circuit for combining the phase-shifted components of the first color-difference signal with the second color-difference signal for minimizing any distortion present in the second color-difference signal; and circuit means responsive to the two distortion-compensated color-difference signals for controlling the color reproduction of the image-reproducing device.

10. A chrominance-signal demodulating system for developing the $(R-Y)$, $(G-Y)$, and $(B-Y)$ color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; a first synchronous detector circuit responsive to the subcarrier frequency chrominance signal for deriving across the output terminals thereof the I color-difference signal, the high-frequency portion of which tends to be halved in amplitude relative to the low-frequency portion thereof; a second synchronous detector circuit responsive to the subcarrier frequency chrominance signal for deriving across the output terminals thereof the Q color-difference signal which tends to include half amplitude frequency components corresponding to the high-frequency portion of the I color-difference signal; a first frequency-selective 90° phase-shift network coupled to the output terminals of the first synchronous detector circuit for developing a phase-shifted signal representative of the half amplitude high-frequency portion of the I color-difference signals; a second frequency-selective 90° phase-shift network coupled to the output terminals of the second synchronous detector circuit for developing a phase-shifted signal representative of the high-frequency I-signal components present in the Q color-difference signal; a first signal-adding circuit coupled between the second frequency-selective circuit and the output terminals of the first synchronous detector circuit for combining the phase-shifted I-signal components from the Q color-difference signal with the I color-difference signal for minimizing any amplitude difference between the high-frequency and low-frequency portions of the I color-difference signal; a second signal-adding circuit coupled between the first frequency-selective circuit and the output terminals of the second synchronous detector circuit for combining the phase-shifted high-frequency components from the I color-difference signal with the Q color-difference signal for minimizing any high-frequency I-signal components present in the Q color-difference signal; and a matrix circuit for combining the distortion-compensated I and Q color-difference signals to develop the desired $(R-Y)$, $(G-Y)$, and $(B-Y)$ color-difference signals for controlling the color reproduction of the image-reproducing device.

11. A chrominance-signal demodulating system for developing the color-difference signals used in controlling the color reproduction of the image-reproducing device of a color-television receiver, the system comprising: circuit means for supplying a subcarrier frequency chrominance signal, the phase and amplitude of which are representative of the color content of the scene being televised; a first synchronous detector circuit responsive to the subcarrier frequency chrominance signal for deriving across the output terminals thereof a first color-difference signal which tends to be distorted; a second synchronous detector circuit responsive to the subcarrier frequency chrominance signal for deriving across the output terminals thereof a second color-difference signal which tends to be distorted; a first tuned circuit coupled to the output terminals of both the first and the second synchronous detector circuits for developing and combining signals representative of selected frequency components of both the first and the second color-difference signals; a second tuned circuit coupled between the first tuned circuit and the output terminals of the first synchronous detector circuit for combining the selected frequency components of the first and second color-difference signals with the first color-difference signal for minimizing any distortion present in the first color-difference signal; a third tuned circuit coupled between the first tuned circuit and the output terminals of the second synchronous detector circuit for combining the selected frequency components of the first and second color-difference signals with the second color-difference signal for minimizing any distortion present in the second color-difference signal; and circuit means responsive to the two distortion-compensated color-difference signals for controlling the color reproduction of the image-reproducing device.

12. A chrominance-signal demodulating system for developing the $(R-Y)$, $(B-Y)$, and $(G-Y)$ color-difference signals used in controlling the color reproduction of the image-reproducing device of a color-television receiver, the system comprising: circuit means for supplying a subcarrier frequency chrominance signal composed of a wide band-width I color-difference modulation component and a narrow band-width Q color-difference modulation component, the phase and amplitude of the resultant chrominance signal being representative of the color content of the scene being televised; a first synchronous detector circuit responsive to the subcarrier frequency chrominance signal for deriving across the output terminals thereof the $(B-Y)$ color-difference signal of which the high-frequency I-signal component tends to be of improper phase and amplitude; a second synchronous detector circuit responsive to the subcarrier frequency chrominance signal for deriving across the output terminals thereof the $(G-Y)$ color-difference signal of which the high-frequency I-signal component tends to be of improper phase and amplitude; a first tuned circuit having a pass band corresponding to the frequency range of the high-frequency portion of the I-signal component and coupled to the output terminals of both the first and the second synchronous detector circuits for developing and combining signals representative of the high-frequency I-signal components of both the $(B-Y)$ and the $(G-Y)$ color-difference signals; a second tuned circuit having a pass band corresponding to the frequency range of the low-frequency portion of the $(B-Y)$ color-difference signal and coupled between the first tuned circuit and the output terminals of the first synchronous detector circuit for combining the high-frequency I signal across the first tuned circuit with the low-frequency portion of the $(B-Y)$ color-difference signal for developing a compensated $(B-Y)$ color-difference signal wherein the phase and amplitude of the high-frequency I-signal component are improved; a third tuned circuit having a pass band corresponding to the frequency range of the low-frequency portion of the $(G-Y)$ color-difference signal and coupled between the first tuned circuit and the output terminals of the second synchronous detector circuit for combining the high-frequency I signal across the first tuned circuit with the low-frequency portion of the $(G-Y)$ color-difference signal for developing a compensated $(G-Y)$ color-difference signal wherein the phase and amplitude of the high-frequency I-signal component are improved; and circuit means for translating the two distortion-compensated $(B-Y)$ and $(G-Y)$ color-difference signals and for combining portions of these signals to develop an $(R-Y)$ color-difference signal, the $(R-Y)$, $(B-Y)$, and $(G-Y)$ color-difference signals being capable of controlling the color reproduction of the image-reproducing device.

References Cited in the file of this patent

UNITED STATES PATENTS 2,725,422 Stark ---------------- Nov. 29, 1955
2,732,425 Pritchard -------------- Jan. 24, 1956

OTHER REFERENCES

"Quadrature Cross Talk," by Bailey and Hirsch, pages 84 to 90, January 1954, Proceedings of the IRE. Copy in Scientific Library.